US010774203B2

(12) United States Patent
Corsi et al.

(10) Patent No.: US 10,774,203 B2
(45) Date of Patent: Sep. 15, 2020

(54) ANTIMICROBIAL POLYMER COMPOSTION

(71) Applicant: MATERIE PLASTICHE PISANE S.R.L., Bientina (Pisa) (IT)

(72) Inventors: Leopoldo Corsi, Ponsacco (IT); Luca Lombardi, Pistoia (IT); Marco Ruzzante, Chiesina Uzzanese (IT)

(73) Assignee: MATERIE PLASTICHE PISANE S.R.L., Bientina (Pisa) (IT)

( * ) Notice: Subject to any disclaimer, the term of this patent is extended or adjusted under 35 U.S.C. 154(b) by 85 days.

(21) Appl. No.: 16/065,242

(22) PCT Filed: Dec. 22, 2016

(86) PCT No.: PCT/IB2016/057919
§ 371 (c)(1),
(2) Date: Jun. 22, 2018

(87) PCT Pub. No.: WO2017/109741
PCT Pub. Date: Jun. 29, 2017

(65) Prior Publication Data
US 2019/0375924 A1    Dec. 12, 2019

(30) Foreign Application Priority Data
Dec. 23, 2015    (IT) .................. 102015000087409

(51) Int. Cl.
*C08L 23/26* (2006.01)
*C08L 23/06* (2006.01)
*C08L 51/06* (2006.01)
*C08L 83/04* (2006.01)
*C08K 3/013* (2018.01)
*B29C 45/00* (2006.01)
*C08K 3/22* (2006.01)

(52) U.S. Cl.
CPC .......... *C08L 23/06* (2013.01); *B29C 45/0001* (2013.01); *C08K 3/013* (2018.01); *C08L 23/26* (2013.01); *C08L 51/06* (2013.01); *C08L 83/04* (2013.01); *B29K 2995/0037* (2013.01); *C08K 2003/2241* (2013.01); *C08L 2203/16* (2013.01); *C08L 2205/08* (2013.01); *C08L 2207/064* (2013.01); *C08L 2310/00* (2013.01)

(58) Field of Classification Search
CPC .......... C08L 23/06; C08L 51/06; C08L 83/04; C08L 23/26
USPC ........................................... 524/413
See application file for complete search history.

(56) References Cited

U.S. PATENT DOCUMENTS

| | | | | |
|---|---|---|---|---|
| 6,291,063 | B1* | 9/2001 | Shah ................. | B32B 27/18 428/331 |
| 2003/0203229 | A1* | 10/2003 | Aral ................. | B32B 37/153 428/515 |
| 2004/0048952 | A1* | 3/2004 | Mei ................. | C09C 1/3676 523/216 |
| 2010/0090182 | A1* | 4/2010 | Tooley ............. | C01G 23/0536 252/589 |
| 2010/0264383 | A1* | 10/2010 | Tooley ............. | C08J 3/226 252/589 |

FOREIGN PATENT DOCUMENTS

| | | |
|---|---|---|
| WO | 2007144577 A1 | 12/2007 |
| WO | 2013087200 A1 | 6/2013 |
| WO | 2016048925 A1 | 3/2016 |

OTHER PUBLICATIONS

Momentive, Date: Jan. 23, 2018.*
Search Report and Written Opinion of PCT/IB2016/057919 dated Apr. 5, 2017.

* cited by examiner

*Primary Examiner* — Deve V Hall
(74) *Attorney, Agent, or Firm* — Silvia Salvadori, P.C.; Silvia Salvadori

(57) ABSTRACT

An antibacterial polymer masterbatch containing a thermoplastic polymer, titanium dioxide and a paraffin or silicone oil and the use thereof in the production of antimicrobial articles made of plastic material, in particular antimicrobial films.

20 Claims, 2 Drawing Sheets

ANTIMICROBIAL POLYMER COMPOSTION

This application is a U.S. national stage of PCT/IB2016/057919 filed on 22 Dec. 2016 which claims priority to and the benefit of Italian Application No. 102015000087409 filed on 23 Dec. 2015, the content of which are incorporated herein by reference in their entireties.

FIELD OF THE INVENTION

The present invention relates to an antimicrobial polymer material containing titanium dioxide and a silicone oil and the use thereof in the production of antimicrobial articles made of plastic material, in particular antimicrobial films for use in the food and health industries.

STATE OF THE ART

Plastic materials represent one of the packaging materials par excellence, since their high workability makes them well suited to being transformed into products of nearly every shape and size.

The primary function of packaging is to contain and protect the products and goods contained in them, in order to enable their handling and delivery from the manufacturer to the consumer.

However, in response to market demands, the primary function of packaging, substantially passive, is increasingly often associated with secondary functions, which render the materials making up the packaging active.

In the food industry, for example, distributors and retailers demand products that remain fresh and microbiologically safe for long periods of time. Since microorganisms can proliferate on the surfaces of plastic materials, the active packaging materials which incorporate antimicrobial functions can effectively respond to this demand.

For this reason, the possibility of making composite plastic materials with a nanometric titanium dioxide filler and containing silicate particles in nanolayers has recently been studied (Katbab P. et al., e-Polymers 2014; 14(1): 43-55).

Titanium dioxide is a photocatalytic chemical species which has various advantages: it has a high efficiency in photocatalysis, is nontoxic and available on the market at moderate costs.

The bactericidal and virucidal effect of titanium dioxide, due to its photocatalytic action, is obtained through the formation of reactive oxygen species generated by the absorbance, by titanium dioxide, of radiation at a given wavelength. The cell walls of viruses and bacteria are decomposed when they enter into contact with the reactive species that have formed as a result of photocatalysis thanks to titanium dioxide.

However, in order to exert its photocatalytic action, titanium dioxide must absorb ultraviolet radiation (UV) originating from solar radiation, of which it forms only a small part, or from an artificial source of radiation having an appropriate wavelength.

Moreover, when added to transparent plastic materials, titanium dioxide, which normally appears as a white solid, can compromise their optical characteristics, particularly transparency and colour, if it undergoes degradation processes during processing of the plastic material comprising additives.

Optical characteristics are particularly important for plastic materials intended for use in the manufacture of transparent packaging, such as, for example, film used in the food industry.

The object of the present invention is thus to provide a polymer material having an antimicrobial activity associated with good optical characteristics, which can be used to make articles of different shapes and sizes, in particular films.

SUMMARY OF THE INVENTION

In a first aspect, the present invention relates to a composition comprising at least one thermoplastic polymer, titanium dioxide and at least one paraffin or silicone oil.

In a further aspect, the present invention relates to the use of said composition for the production of antimicrobial articles made of plastic material, obtained by injection moulding, extrusion moulding, thermoforming, blow moulding and stretch-blow moulding, preferably for the production of films.

In a further aspect, the present invention relates to an antimicrobial article made of plastic material, preferably an antimicrobial polymer film, comprising the composition according to the present invention, wherein said article can be obtained by injection moulding, extrusion moulding, thermoforming, blow moulding and stretch-blow moulding.

BRIEF DESCRIPTION OF THE FIGURES

The invention will be described below in detail, also with reference to FIGS. 1 and 2, which show.

DETAILED DESCRIPTION OF THE INVENTION

Figure 1:
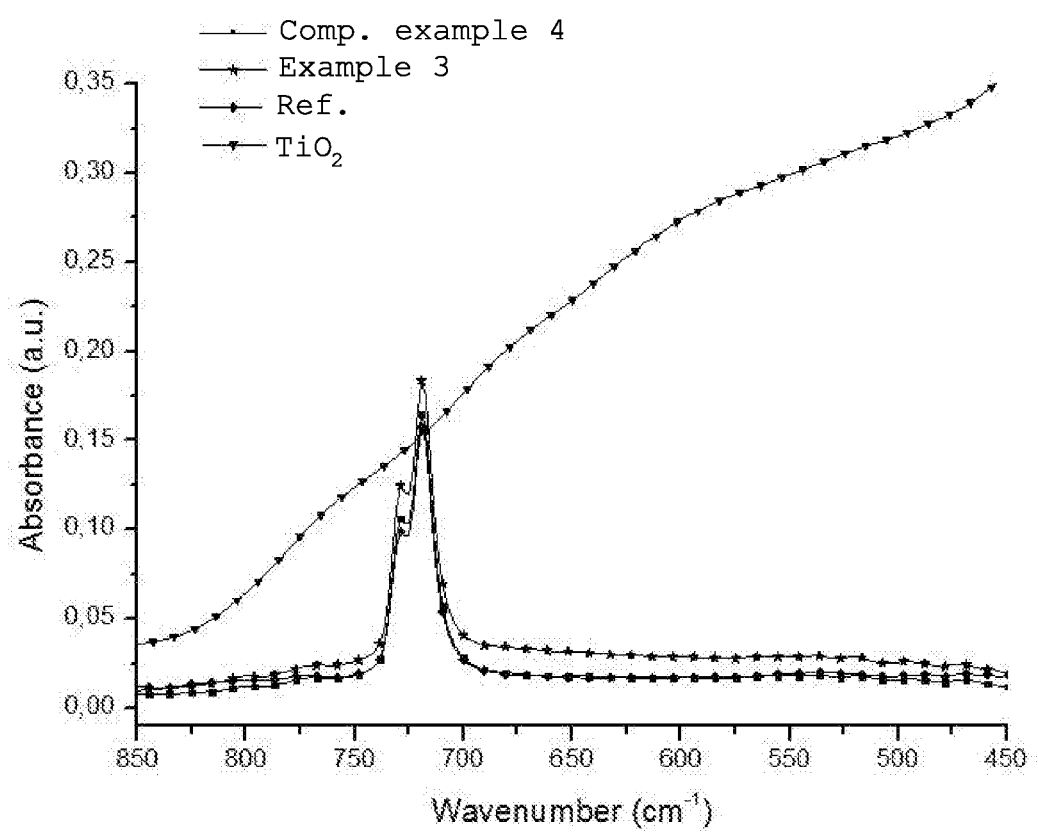
FIG. 1: FT-IR spectra of the samples produced in Examples 3 and 4, compared with the spectrum of $TiO_2$ and of an LLDPE film.

In the present description and in the appended claims, the percentages are to be understood as expressed by weight, unless specified otherwise. In the present description and in the appended claims the term "antimicrobial" refers to a substance, composition or article having bactericidal and/or virucidal activity.

In the present description and in the appended claims, "silicone oil" refers to a polysiloxane having organic side groups bonded to the silicon of the main silicon-oxygen chain.

In a first aspect, the present invention relates to a composition, preferably an antimicrobial composition, comprising at least one thermoplastic polymer, titanium dioxide and at least one paraffin or silicone oil.

The at least one thermoplastic polymer usable for the production of the composition according to the invention can be selected from among high-density polyethylene (HDPE), low-density polyethylene (LDPE), linear low-density polyethylene (LLDPE), polypropylene, polystyrene, polyethylene terephthalate, polyvinyl chloride, polylactic acid, polyamides and mixtures thereof. Preferably, the at least one thermoplastic polymer can be selected from among HDPE, LDPE, LLDPE and mixtures thereof.

According to one variant embodiment, the at least one thermoplastic polymer can be LLDPE. The linear low-density polyethylene (LLDPE) can be a copolymer of ethylene with variable percentages of C4-C8 linear alkenes.

According to one variant embodiment, the composition of the invention can comprise about 60.0-98.0% by weight of at least one thermoplastic polymer as described above, preferably about 75.0-96.0% by weight, more preferably about 78.0-95.0% by weight.

The composition according to the invention further comprises titanium dioxide, preferably in the form of anatase or rutile/anatase mixtures, as an antimicrobial agent.

The primary particles of titanium dioxide can have a diameter of less than about 1.0 μm, preferably less than or equal to about 150 nm, being preferably comprised between about 5 and about 100 nm, more preferably between about 10 and about 30 nm. The choice of the diameter of the titanium dioxide particles present in the composition of the invention depends on the thickness of the article it is intended to make: in the case of an antimicrobial polymer film, for example, the solid particles should preferably have dimensions such as not to be visible in the film. Moreover, the use of titanium dioxide of nanometric dimensions has the further advantage of increasing the surface area of the material and consequently the active surface thereof during photocatalysis.

According to one variant embodiment, the composition of the invention can comprise about 1-20% by weight of titanium dioxide, preferably about 2.0-14.0% by weight, more preferably about 5-12% by weight.

The composition of the invention further comprises at least one paraffin or silicone oil, preferably at least one silicone oil.

According to one embodiment, the composition of the invention can comprise about 0.01-1.5% by weight, preferably about 0.05-1.0% by weight, more preferably about 0.1-1.0%, even more preferably about 0.2-0.8% of at least one paraffin or silicone oil, preferably silicone oil. The concentration of paraffin or silicone oil that can be added to the composition according to the invention is a function of the viscosity of the oil. In one embodiment, the amount of at least one paraffin or silicone oil can be present in the composition according to the invention at the values shown below:

| oil viscosity (cP) | conc. of oil in the composition (% by weight) |
|---|---|
| 10-50 | 0.5-1.5 |
| 50-350 | 0.25-1.0 |
| 350-600 | 0.1-0.5 |
| >600 | 0.01-0.2 |

According to one particularly preferred embodiment, the at least one oil can be at least one silicone oil having at least one of the following physicochemical characteristics:
  density comprised in the range of about 0.800-0.960 g/cm³, preferably about 0.850-0.950 g/cm³; and/or
  rotational viscosity comprised in the range of about 280-460 cP, preferably about 320-400 cP; and/or
  exhibiting at least one crystalline form having a melting temperature comprised between about −55° and −25° C., preferably comprised between about −50° and −30° C. Preferably, the at least one silicone oil can have two crystalline forms having a melting point comprised in the ranges stated above.

In one embodiment, the at least one silicone oil can have all the physicochemical characteristics described above.

The Applicant has surprisingly found that the presence of the at least one paraffin or silicone oil, preferably a silicone oil, having the characteristics described above leads to an increase in the antimicrobial activity of the composition according to the invention, the concentration of titanium dioxide being equal.

Moreover, the optical characteristics of the composition are greatly improved by the presence of the paraffin or silicone oil, preferably by the presence of the at least one silicone oil. In fact, the composition according to the invention appears as a white solid which, when used for the production of films, enables transparent films to be obtained. The possibility of obtaining transparent antimicrobial polymer films responds not only to market demands, but also has a technological advantage compared to opaque films: the transparency of the material in fact favours the penetration of light through it, thus increasing the yield of photoactivation of the titanium dioxide.

The Applicant has surprisingly found that the presence of paraffin or silicone oil, preferably silicone oil, in the composition of the invention causes a shift in the UV photoactivation band of titanium dioxide to visible wavelengths. This shift has the advantage of making it possible to activate the titanium dioxide, and thus to activate the antimicrobial properties thereof, by irradiation of the composition with visible light. Since visible light represents a significant portion of the solar spectrum, it is thus possible to activate the composition according to the invention also by exploiting sunlight, without any need to rely on artificial light sources.

According to a further and preferred variant embodiment, the composition according to the invention can further comprise about 1-15%, preferably about 2-10%, of at least one compatibilizing agent selected from among polyolefins functionalized with maleic anhydride, polyolefins functionalized with maleic anhydride and at least one high-boiling ester of maleic anhydride, acrylic copolymers, ethylene vinyl acetate copolymers and mixtures thereof.

Among the acrylic polymers, poly methyl acrylates, poly methyl methacrylates, poly ethyl acrylates, poly butyl acrylates and mixtures thereof are preferred as compatibilizing agents in the composition according to the invention.

According to a preferred variant, the at least one compatibilizing agent can be selected from among polyolefins functionalized with maleic anhydride, polyolefins functionalized with maleic anhydride and at least one high-boiling ester of maleic anhydride and mixtures thereof.

In the present description and in the appended claims, the term "functionalized polyolefin" refers to a polyolefin in which polar side chains comprising maleic anhydride, maleic anhydride and at least one high-boiling ester of maleic anhydride, and mixtures thereof are grafted on the main polyolefin chain.

According to one embodiment, the functionalized polyolefin can be selected from among functionalized HDPE, LDPE and LLDPE and mixtures thereof. In order to favour the compatibilization between the thermoplastic polymer and the other components of the composition according to the invention, the functionalized polyolefin can preferably have physicochemical properties that are identical or similar to those of the thermoplastic polymer present in the composition according to the invention.

The functionalized polyolefin can comprise a high-boiling ester of maleic anhydride, wherein said ester has a boiling temperature higher than 150° C. and can be preferably selected from among mono- and di-esters of maleic anhydride with linear or branched C1-C4 monoalcohols.

The degree of functionalization of the functionalized polyolefin can be generally comprised between about 0.05 and about 1%. The at least one compatibilizing agent usable for the production of the composition according to the invention is commercially available and can be for example obtained as described in patent application WO99/35172. According to one embodiment, the at least one compatibilizing agent can have a Melt Flow Rate (190° C.; 2.16 Kg) comprised in the range of about 1-40 g/10 min., preferably about 1-10 g/10 min.

In order to expand and reinforce the antimicrobial action of the titanium dioxide, according to a further variant embodiment, the composition of the invention can also comprise about 0.5-3% of at least one further antimicrobial, antibacterial or antiviral agent, other than titanium dioxide, such as, for example, benzoic acid.

The composition according to the invention is generally produced in the form of a masterbatch, i.e. in the form of pellets, via a mixing process with the components in a melted state (melt blending), using equipment known per se in the art, for example using a twin-screw extruder.

The antimicrobial properties of the composition according to the invention enable said composition to be advantageously used for the production of articles made of plastic material having antimicrobial properties, which can in turn have application in all sectors in which the antimicrobial properties of the material are particularly advantageous (food, medical industries, etc.).

In a further aspect thereof, the present invention relates to the use of the composition according to the invention for the production of antimicrobial articles made of plastic material, preferably thermoplastic material, preferably by injection moulding, extrusion moulding, thermoforming, blow moulding and stretch-blow moulding, preferably for the production of films. Therefore, in a further aspect, the present invention relates to an antimicrobial article made of plastic material, preferably thermoplastic material, comprising the composition according to the invention, wherein said article can be obtained by injection moulding, extrusion moulding, thermoforming, blow moulding and stretch-blow moulding.

Said article can be, for example, packaging, i.e. an article made of plastic material, preferably thermoplastic material, designed to contain goods (from raw materials to finished products), protect them, enable their handling and their delivery from the manufacturer to the consumer or user, and assure their presentation, or else a disposable article, likewise made of plastic material, preferably thermoplastic, used for the same purpose. Examples of such articles are trays, containers, plates, glasses, cups, cutlery, bottles, canisters, films, etc.

Said antimicrobial articles made of plastic material can be products using known equipment, by means of a process which comprises;
mixing variable amounts of the composition according to the invention with at least one thermoplastic polymer, so as to obtain a mixture; and
forming said mixture, preferably by injection moulding, extrusion moulding, thermoforming, blow moulding and stretch-blow moulding.

According to one variant embodiment, the composition of the invention can be used for the production of antimicrobial polymer films, in particular for the production of multilayer antimicrobial polymer films. According to a further variant, the composition of the invention can be used for the production of heat-shrinkable or heat-stretchable antimicrobial polymer films.

According to a further variant, the composition of the invention can be used for the production of oriented antimicrobial polymer films, preferably bioriented antimicrobial polymer films.

In a further aspect thereof, the present invention thus relates to an antimicrobial polymer film comprising the composition according to the present invention.

In one embodiment, said antimicrobial polymer film can comprise:
(a) about 15-70% by weight, preferably about 20-60% by weight, of the composition according to the invention as described above; and
(b) about 30-85% by weight, preferably about 40-80% by weight, of at least one thermoplastic polymer selected from among high-density polyethylene (HDPE), low-density polyethylene (LDPE), linear low-density polyethylene (LLDPE), polypropylene, polystyrene, polyethylene terephthalate, polyvinyl chloride, polylactic acid, polyamides and mixtures thereof, preferably selected from among HDPE, LDPE, LLDPE and mixtures thereof. More preferably, said thermoplastic polymer can be LLDPE. The linear low-density polyethylene (LLDPE) can be a copolymer of ethylene with variable percentages of C4-C8 linear alkenes.

In a further embodiment, the thermoplastic polymer (b) can consist of the same polymer material used for the preparation of the composition according to the invention.

The thickness of the antimicrobial polymer film according to the invention varies according to the final application of the film itself. According to one variant, the antimicrobial polymer film can have an overall thickness about 3 μm, preferably said thickness is comprised between about 5 and about 50 μm, more preferably between about 10 and about 35 μm. The antimicrobial polymer film according to the invention can be a monolayer film or, preferably, a multilayer film.

According to one embodiment, the antimicrobial polymer film appears as a multilayer film which comprises at least one layer (i) comprising the composition according to the invention and at least one layer (ii) comprising a thermoplastic polymer bonded to said layer (i).

According to one variant, the at least one layer (i) can comprise:
(a) about 15-70% by weight, preferably about 20-60% by weight, of the composition according to the invention as described above; e
(b) about 30-85% by weight, preferably about 40-80% by weight, of at least one thermoplastic polymer selected from among high-density polyethylene (HDPE), low-density polyethylene (LDPE), linear low-density polyethylene (LLDPE), polypropylene, polystyrene, polyethylene terephthalate, polyvinyl chloride, polylactic acid, polyamides and mixtures thereof, preferably selected from among HDPE, LDPE, LLDPE and mixtures thereof. More preferably, said thermoplastic polymer can be LLDPE. The linear low-density polyethylene (LLDPE) can be a copolymer of ethylene with variable percentages of C4-C8 linear alkenes.

According to a further variant, the at least one layer (ii) can comprise at least one thermoplastic polymer selected from among high-density polyethylene (HDPE), low-density polyethylene (LDPE), linear low-density polyethylene (LLDPE), polypropylene, polystyrene, polyethylene terephthalate, polyvinyl chloride, polylactic acid, polyamides and mixtures thereof, preferably selected from among HDPE, LDPE, LLDPE and mixtures thereof, more preferably said thermoplastic polymer can be LLDPE. The linear low-density polyethylene (LLDPE) can be a copolymer of ethylene with variable percentages of C4-C8 linear alkenes.

The chemical nature and the physicochemical characteristics of the thermoplastic polymer forming the layer (ii) depend on the final application of the film.

The multilayer antimicrobial polymer film of the invention can comprise a number of layers which varies according to the final application of the film. According to one variant, the number of layers can be comprised between 2 and 20.

The thickness of the multilayer antimicrobial polymer film according to the invention varies according to the final application of the film itself. According to one variant, the multilayer antimicrobial polymer film can have an overall thickness about 5 µm, preferably said thickness can be comprised between about 10 and 50 µm, more preferably between about 15 and 40 µm.

Moreover, in the multilayer antimicrobial polymer film the thickness of the layer (i) comprising the composition according to the invention can range from about 5 to 50%, preferably from about 10 to 30%, relative to the overall film thickness.

According to one embodiment, the multilayer antimicrobial polymer film as described above can have a structure of the A/B/C type, wherein the layer (i) comprising the composition according to the invention can be independently selected from among layer A, layer B and layer C. The composition according to the invention can thus be contained in at least one of the layers A, B or C. In a first variant, the layer (i) comprising the composition according to the invention can be independently selected between layer A and layer C. According to this variant, the composition according to the invention is contained in at least one of the outer layers of the multilayer film.

The thickness of the multilayer antimicrobial polymer film having an A/B/C structure varies according to the final application of the film itself. According to one variant, said multilayer antimicrobial polymer film having structure of the A/B/C type can have an overall film thickness between about 5 and 50 µm, preferably said thickness can be comprised between about 15 and 40 µm.

In the multilayer antimicrobial polymer film having an A/B/C structure, the thickness of the layer A can be equal to the thickness of the layer C. Moreover, in the multilayer antimicrobial polymer film having an A/B/C structure, the thickness of the inner layer B can be comprised between about 30 and about 80%, preferably between about 45 and about 70%, relative to the overall film thickness.

The antimicrobial polymer film according to the invention—monolayer or multilayer—can be produced by means of known techniques and equipment, for example by extrusion through a flat-film or a blown-film die.

The antimicrobial polymer film can further comprise organic or inorganic additives, known per se in the art, such as lubricants, adhesion promoters and/or plasticizers, in order to optimise the process of production of the film itself or the technological characteristics thereof.

In a further aspect, the present invention relates to the use of an antimicrobial polymer film as described above.

The antimicrobial polymer film of the invention can have application in every sector in which the antimicrobial properties of the material may be useful. It can thus be advantageously used as a packaging material in the food sector, in order to preserve the freshness of foods by preventing and slowing bacterial proliferation.

A further advantage of the antimicrobial polymer film according to the invention consists in the fact that the film does not release the silicone or paraffin oil and/or the titanium dioxide when subjected to a leaching test as indicated below, using the simulating liquids normally employed for tests to verify the suitability of polymer materials for contact with foods.

Also in the embodiment thereof comprising a functionalized polyolefin as described above as at least one compatibilizing agent, it has been verified that the antimicrobial polymer film does not release maleic anhydride under the test conditions used.

Or else, it can have application as a covering material, for example in the health care sector, for wrapping objects it is intended to preserve from bacterial proliferation, such as, for example, the components of the dental units used in dental clinics.

The present invention further relates to the use of the antimicrobial polymer film described above in the food or health industry.

The present invention is further illustrated by means of examples, which have a non-limiting illustrative purpose.

Measurement methods Dimensions of primary particles of titanium dioxide: dynamic light scattering;

Density of silicone oil: densimetric balance (temp. 25° C.);

Rotational viscosity of the silicone oil: Brookfield viscometer with S62 impeller and speed 60 rpm, temp. 25° C.;

Degree of functionalization of functionalized polyolefin: CHN elemental analysis;

Melting point of silicone oil: differential scanning calorimetry (DSC). First heating: from −90° to 30° C. at a rate of 20° C./min. in nitrogen. Cooling from 30° to −90° C. at a rate of 20° C./min. in nitrogen. Second heating from −90° to 30° C. at a rate of 20° C./min. in nitrogen. The determination of melting points is performed during the second heating.

Antibacterial activity: Standard ISO 27447:2009

Maleic anhydride and titanium migration test: Reg. (EU) 10/2011.

Overall migration test: Reg. (EU) 10/2011 for articles for long-term use.

Silicone oil migration test: Reg. (EC) 1935/2004.

Heavy metal migration test: Reg. (EU) 10/2011 and Reg. (EU) 2016/1416.

In the example embodiments and comparative examples that follow, "LLDPE" refers to a linear low-density polyethylene a having melt flow index of 2.7 g/10 min, density of 0.918 g/cm$^3$ and melting point of 121° C.

Example 1

The composition according to the invention was prepared in the form of a masterbatch by mixing the following components:
85% LLDPE;
5% compatibilizing agent: LLDPE functionalized with maleic anhydride (Auserpolymers Srl) having a melt flow index of 1-3 g/10 min, density of 0.910-0.930 g/cm$^3$ and degree of functionalization of 0.5±0.2;
10% by weight of TiO$_2$ having a primary particle size of 25 µm (Aeroxide® P25—Aerosil);
0.2% silicone oil having the following physicochemical properties:
density 0.900 g/cm$^3$;
rotational viscosity 359 cP;
melting temperature: −44.95° C. and −35.48° C.

The components listed above were mixed and extruded as pellets in a twin-screw extruder with 5 temperature control points, operated at the temperatures of 180°, 200°, 220° and 220° along the extrusion screw and at 8-20 rpm. The masterbatch obtained was opaque white in colour.

Example 2—Comparative

Under conditions analogous to the ones illustrated in example 1, a composition was produced which contained the same percentages by weight of titanium dioxide and compatibilizing agent as in example 1, but no silicone oil. The masterbatch obtained exhibited a pinkish yellow colour.

Example 3

A transparent three-layer antimicrobial film having an A/B/C configuration, with an overall thickness of 23.5 μm was prepared by extrusion using the masterbatch of Example 1 (inlet temperature 200° C.—outlet temperature 265° C.).
layer A: mixture containing 50% masterbatch prepared in example 1 and 50% LLDPE used in example 1 for the preparation of the masterbatch. Thickness of layer A=4.7 μm;
layer B: LLDPE. Thickness of layer B=14.1 μm;
Layer C: LLDPE with small percentages of an additive to impart adhesive properties to the layer. Thickness of layer C=4.7 μm.

Example 4 (Comparison)

In the comparative example 4, a three-layer film was prepared, analogous to the one prepared in example 3, using a mixture containing 50% of the masterbatch prepared in example 2 (with no silicone oil) and 50% LLDPE for layer A. The remaining characteristics of the film were maintained unchanged from example 3. The film exhibited a light amber colour.

FIG. 1 shows the FT-IR spectra of the films of example 3 and the comparative example 4, as well as the spectrum of titanium dioxide. By way of further comparison, the spectrum of a three-layer film having an A/B/C structure (Ref.) is also shown; it differs from the film of example 3 in that it does not contain, in layer A, nanoparticles of $TiO_2$ and silicone oil. The outer layer A is an LLDPE with the addition of LLDPE functionalized with maleic anhydride, whereas the other two layers are LLDPE (layer B) and LLDPE with an additive to impart an adhesive characteristic (layer C). The peak at 725 $cm^{-1}$ is to be attributed to the LLDPE and, as emerges from the comparison of the different spectra, it is not affected by the presence of titanium dioxide. In the zone between 700 and 500 $cm^{-1}$, where the $TiO_2$ shows a strong absorbance band; one notes an increase in the intensity of absorbance in the sample of example 3 compared to the LLDPE. The sample of the comparative example 4 shows, by contrast, a lower absorbance in the same region of the spectrum, comparable to that of the LLDPE.

Example 5 and Example 6 (Comparison)

Microbiological analyses were performed on the samples prepared in example 3 and in the comparative example 4 by irradiating the test samples of film with UV light, with an irradiation of 0.021 milliW/$cm^2$ according to standard ISO 27447:2009.
Table 1 shows the results of the microbiological analyses performed using *Staphylococcus aureus* as the bacterial strain, expressed in CFU per 25 $cm^2$, measured al time t=0 and after 24 hours, and as a percentage of reduction.

TABLE 1

| | Film | CFU/25 $cm^2$ at t = 0 | CFU/25 $cm^2$ at t = 24 h | Reduction (%) |
|---|---|---|---|---|
| Example 5 | Ex. 3 502023/5_SIL | 24,400 | 15,200 | 75.5 |
| Example 6 (comparison) | Ex. 4 cf 502023/5_no_SIL | 24,400 | 11,600 | 52.5 |

Examples 7-12

A masterbatch was prepared using the same components and same extrusion conditions as in example 1, having the following composition:
85% LLDPE;
5% compatibilizing agent;
10% by weight of $TiO_2$;
0.4% silicone oil.
The masterbatch was used in the preparation for extrusion (inlet temperature 200° C.—outlet temperature 265° C.) of transparent three-layer antimicrobial films having an A/B/C configuration, and whose characteristics are shown in Table 2.

TABLE 2

| | total thickness (μm) | LAYER A(*) comp. (%) | LAYER A(*) thickness (μm) | LAYER B comp. (%) | LAYER B thickness (μm) | LAYER C comp. (%) | LAYER C thickness (μm) |
|---|---|---|---|---|---|---|---|
| Example 7 (502020) | 20 | 50 | 4.0 | LLDPE 100% | 12.0 | LLDPE 100%(**) | 4.0 |
| Example 8 (501520) | 20 | 50 | 3.0 | | 14.0 | | 3.0 |
| Example 9 (501523/5) | 23.5 | 50 | 3.5 | | 16.5 | | 3.5 |
| Example 10 (502023/5) | 23.5 | 50 | 4.7 | | 14.1 | | 4.7 |
| Example 11 (251523/5) | 23.5 | 25 | 3.5 | | 16.5 | | 3.5 |
| Example 12 (252023/5) | 23.5 | 25 | 4.7 | | 14.1 | | 4.7 |

(*)layer A was obtained by mixing under extrusion the specified amount of masterbatch with LLDPE.
(**)layer C contains small percentages of an additive for imparting adhesive properties to the layer.

Figure 2:
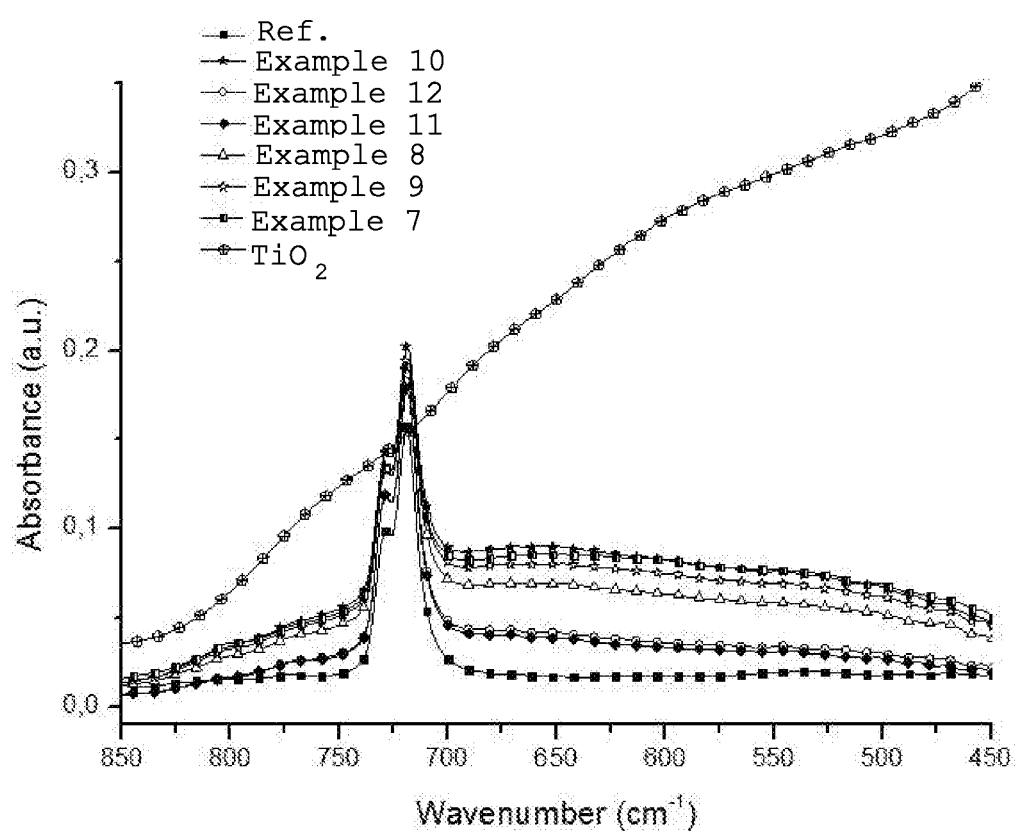
FIG. 2: FT-IR spectra of the film in examples 7-12, and, by way of comparison, the spectrum of titanium dioxide and the spectrum of a monolayer LLDPE.

FIG. 2 shows the FT-IR spectra of the film of examples 7-12, and, by way of comparison, the spectrum of titanium dioxide and the spectrum of a 23.5 μm thick monolayer film made of LLDPE (Ref.). The absorbance in the 800-450 cm-1 region of the spectrum is proportional to the amount of titanium dioxide present in the layer A: the wide absorbance band is in fact less intense for the samples containing 25% of masterbatch, and increases in intensity in the samples in which the masterbatch concentration is 50%.

The microbiological analyses performed by irradiating the samples of film produced in examples 7-12 with UV light and irradiation of 0.021 milliW/$cm^2$ gave a substantially negative result, showing a very low or even no reduction in the bacterial count.

The samples produced in examples 10 and 12 were subjected to a further test to evaluate the antibacterial activity after the samples had been irradiated with a fluorescent lamp (visible light), with an irradiation of 0.014 milliW/$cm^2$.

Table 3 shows the results of the microbiological analyses performed using *Staphylococcus aureus* as the bacterial strain, expressed in CFU per 25 cm², measured at time t=0 and after 24 hours, and as a percentage of reduction.

TABLE 3

|  | CFU/25 cm² at t = 0 | CFU/25 cm² at t = 24 h | Reduction (%) |
|---|---|---|---|
| Example 10 (502023/5) | 24.000 | 2.200 | 91.0 |
| Example 12 (252023/5) | 24.000 | 3.100 | 87.0 |

Example 13

The antimicrobial polymer film of example 3 was subjected to a leaching test according to the methods described above.

Table 4 shows the test conditions and the results obtained. All tests were performed maintaining the antimicrobial polymer film in contact with the simulating liquid for 10 days at a temperature of 40° C.

TABLE 4

|  | Parameters | Result | U.M. |
|---|---|---|---|
| Overall migration | Simulant | Ethanol 10% | mg/dm³ |
|  | Amount | <1 |  |
|  | Simulant | Acetic acid 3% | mg/dm³ |
|  | Amount | <1 |  |
|  | Simulant | Ethanol 95% | mg/dm³ |
|  | Amount | <1 |  |
| Heavy metals | Simulant | Acetic acid 3% |  |
|  | Barium | <0.1 | mg/Kg |
|  | Cobalt | <0.04 | mg/Kg |
|  | Copper | <1 | mg/Kg |
|  | Iron | <5 | mg/Kg |
|  | Manganese | <0.1 | mg/Kg |
|  | Zinc | <2.5 | mg/Kg |
|  | Lithium | <0.1 | mg/Kg |
| Maleic anhydride | Simulant | Ethanol 10% | mg/Kg |
|  | Result | <1 |  |
| Titanium | Simulant | Acetic acid 3% | mg/Kg |
|  | Result | <1 |  |
|  | Simulant | Ethanol 95% | mg/Kg |
|  | Result | <1 |  |
| Silicone oil | Simulant | Acetic acid 3% | mg/Kg |
|  | Result | <1 |  |

The invention claimed is:

1. A composition comprising at least one thermoplastic polymer, titanium dioxide and at least one silicone oil characterized as it follows
   density comprised in range of 0.800-0.960 g/cm³;
   rotational viscosity comprised in range of 280-460 cP; and
   exhibiting at least one crystalline form having a melting temperature comprised between −55° and −25° C.

2. The composition according to claim 1, wherein the at least one thermoplastic polymer is selected from among high-density polyethylene (HDPE), low-density polyethylene (LDPE), linear low-density polyethylene (LLDPE), polypropylene, polystyrene, polyethylene terephthalate, polyvinyl chloride, polylactic acid, polyamides and mixtures thereof.

3. The composition according to claim 1, comprising 60.0-98.0% by weight of at least one thermoplastic polymer.

4. The composition according to claim 1, comprising 1-20% titanium dioxide by weight.

5. The composition according to claim 1, wherein primary particles of titanium dioxide have a diameter of less than 1.0 µm.

6. The composition according to claim 1, comprising 0.01-1.5% by weight of silicone oil.

7. The composition according to claim 1, further comprising 1-15% by weight of at least one compatibilizing agent selected from among polyolefins functionalized with maleic anhydride, polyolefins functionalized with maleic anhydride and at least one high-boiling ester of maleic anhydride, acrylic copolymers, ethylene vinyl acetate copolymers and mixtures thereof.

8. A method for the production of antimicrobial articles made of plastic material, comprising forming the composition according to claim 1 by injection moulding, extrusion moulding, thermoforming, blow moulding and stretch-blow moulding.

9. An antimicrobial article made of plastic material comprising the composition according to claim 1, wherein said article is obtained by injection moulding, extrusion moulding, thermoforming, blow moulding and stretch-blow moulding.

10. The antimicrobial article according to claim 9, wherein said article is an antimicrobial multilayer polymer film.

11. An antimicrobial article made of plastic material comprising a composition comprising at least one thermoplastic polymer, titanium dioxide and at least one silicone or paraffine oil, wherein said article is obtained by injection moulding, extrusion moulding, thermoforming, blow moulding or stretch-blow moulding and wherein said article is an antimicrobial multilayer polymer film according to claim 10, comprising
   at least one layer (i) comprising the composition comprising at least one thermoplastic polymer, titanium dioxide and at least one silicone or paraffin oil and
   at least one layer (ii) comprising a thermoplastic polymer bonded to said layer (i).

12. The antimicrobial article polymer film according to claim 11, wherein the layer (i) of said antimicrobial multilayer polymer film comprises:
   (a) 15-70% by weight of said composition comprising at least one thermoplastic polymer, titanium dioxide and at least one silicone or paraffin oil; and
   (b) 30-85% by weight of at least one thermoplastic polymer selected from among high-density polyethylene (HDPE), low-density polyethylene (LDPE), linear low-density polyethylene (LLDPE), polypropylene, polystyrene, polyethylene terephthalate, polyvinyl chloride, polylactic acid, polyamides and mixtures thereof.

13. The antimicrobial article according to claim 11, having an A/B/C structure, wherein the layer (i) of said antimicrobial multilayer polymer film, which comprises a composition comprising at least one thermoplastic polymer, titanium dioxide and at least one silicone or paraffin oil is independently selected from among layer A, layer B and layer C.

14. The composition according to claim 1 or the antimicrobial article according to claim 12, wherein the at least one thermoplastic polymer is linear low-density polyethylene (LLDPE).

15. The composition according to claim 1, wherein the primary particles of titanium dioxide have a diameter comprised between 5 and 100 nm.

16. The composition according to claim 1, wherein the composition comprises 0.05-1% by weight of silicone oil.

17. The antimicrobial article according to claim 13, wherein the layer (i) of said antimicrobial multilayer polymer film, which comprises at least one thermoplastic polymer, titanium dioxide and at least one silicone or paraffin oil is selected from layer A or layer C.

18. The composition according to claim 1, wherein density is comprised in the range of between 0.850 and 0.950 g/cm$^3$.

19. The composition according to claim 1, wherein the rotational viscosity is comprised in the range of between 320 and 400 cP.

20. The composition according to claim 1, wherein the melting temperature is comprised in the range of between −50 and −30° C.

\* \* \* \* \*